United States Patent
Kannadasan et al.

(10) Patent No.: US 12,182,134 B2
(45) Date of Patent: Dec. 31, 2024

(54) SEARCH SYSTEM RANKING USING A NATURAL DISTRIBUTION

(71) Applicant: eBay Inc., San Jose, CA (US)

(72) Inventors: Manojkumar Rangasamy Kannadasan, Fremont, CA (US); Amit Jaiswal, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 615 days.

(21) Appl. No.: 16/870,541

(22) Filed: May 8, 2020

(65) Prior Publication Data
US 2021/0263938 A1    Aug. 26, 2021

Related U.S. Application Data

(60) Provisional application No. 62/979,727, filed on Feb. 21, 2020.

(51) Int. Cl.
*G06F 7/02*        (2006.01)
*G06F 16/00*    (2019.01)
(Continued)

(52) U.S. Cl.
CPC ...... *G06F 16/24578* (2019.01); *G06F 16/951* (2019.01); *G06F 16/9538* (2019.01); *G06F 16/3349* (2019.01); *G06F 16/338* (2019.01)

(58) Field of Classification Search
CPC ............. G06F 16/24578; G06F 16/951; G06F 16/9538; G06F 16/338; G06F 16/248;
(Continued)

(56) References Cited

U.S. PATENT DOCUMENTS 8,117,197 B1 *  2/2012  Cramer ................. G06F 16/248
                                                                  707/731
9,064,016 B2    6/2015  Shokouhi et al.
(Continued)

FOREIGN PATENT DOCUMENTS

WO        2021/167759 A1    8/2021

OTHER PUBLICATIONS

Slawski, Bill, "20 Ways Search Engines May Rerank Search Results," Oct. 14, 2006, taken from https://www.seobythesea.com/2006/10/20-ways-search-engines-may-rerank-search-results/ on Aug. 17, 2022. (Year: 2006).*
(Continued)

*Primary Examiner* — Bruce M Moser
(74) *Attorney, Agent, or Firm* — Shook, Hardy & Bacon, L.L.P.

(57) ABSTRACT

A search engine is provided that generates search results proportional to a natural distribution. Search results identified and ranked by the search engine for a search query are redistributed so that a fixed number of top ranked search results include search result attributes proportional to the natural distribution, as determined from interaction tracking of prior search results. A natural distribution index mapping prior search queries to search result attributes and a proportional representation of interactions with the search result attributes is generated. The natural distribution is determined from the proportional representation of interactions. The search engine redistributes the fixed number of top ranked search results by minimizing a gap between the ranked set of search results for the search query and the natural distribution.

20 Claims, 5 Drawing Sheets

(51) Int. Cl.
*G06F 16/2457* (2019.01)
*G06F 16/951* (2019.01)
*G06F 16/9538* (2019.01)
*G06F 16/33* (2019.01)
*G06F 16/338* (2019.01)

(58) Field of Classification Search
CPC .. G06F 16/3349; G06F 16/438; G06F 16/538; G06F 16/638; G06F 16/9038
See application file for complete search history.

(56) References Cited

U.S. PATENT DOCUMENTS

| | | |
|---|---|---|
| 10,146,872 B2 | 12/2018 | Carmel et al. |
| 2012/0226687 A1 | 9/2012 | Xu et al. |
| 2015/0032717 A1* | 1/2015 | Cramer ............. G06F 16/24575 707/709 |
| 2015/0142787 A1* | 5/2015 | Kimmerling ..... G06F 16/24578 707/723 |
| 2016/0196348 A1* | 7/2016 | Rodriguez ........ G06F 16/90324 707/727 |
| 2018/0121803 A1* | 5/2018 | Chan ...................... G06F 16/248 |
| 2021/0026906 A1* | 1/2021 | Reznik .............. G06F 16/24578 |

OTHER PUBLICATIONS

Radlinski et al., "Query Chains: Learning to Rank from Implicit Feedback," KDD Aug. 2005 (Year: 2005).*
International Search Report for PCT Patent Application No. PCT/US2021/015110, mailed on Apr. 14, 2021, 5 pages.
Written Opinion for PCT Patent Application No. PCT/US2021/015110, mailed on Apr. 14, 2021, 9 Pages.
International Preliminary Report on Patentability received for PCT Patent Application No. PCT/US2021/015110, mailed on Sep. 1, 2022, 9 pages.

* cited by examiner

SEARCH SYSTEM RANKING USING A NATURAL DISTRIBUTION

CROSS-REFERENCE TO RELATED APPLICATIONS

This application claims priority to U.S. Provisional Application No. 62/979,727, filed on Feb. 21, 2020, and entitled "Search System Ranking Using a Natural Distribution," which is incorporated by reference in its entirety.

BACKGROUND

Conventional search systems receive a search query and provide search results in response. Search systems often index information for an extraordinarily large number of items that can be returned as search results for the search query. Upon receiving a search query, conventional search systems identify relevant items. The relevance of these items to the search query is scored, and the items are ranked based on this score. The search engine then provides the ranked items as search results.

SUMMARY

At a high level, aspects described herein relate to redistributing search results proportional to a natural distribution. By redistributing and providing search results that are proportional to the natural distribution, the intended search results are presented in a manner where they can be identified.

When a search query is received by a search engine, a set of search results is identified for the search query. The search engine ranks the set of search results to generate a ranked set of search results. A blender is applied to the ranked set of search results. The blender redistributes at least a portion, such as a fixed number of top-ranked search results, in a manner that is proportional to the natural distribution.

The natural distribution is determined using a natural distribution index. The natural distribution index comprises search query terms of prior search queries. The natural distribution index maps the search query terms to search result attributes of search results for the prior search queries. For example, a prior search query for "iPhone" can be mapped to search results related to iPhones. These related search results include iPhone attributes, such as model, color, condition, and so forth. The natural distribution index also includes a proportional representation of interactions with the search result attributes. For instance, interactions tracked for the search query "iPhone" might identify interactions with search results for black iPhones 80% of the time, while interactions with search results of white iPhones occurs 20% of the time. The natural distribution is then determined based on this proportional representation of interactions with the search result attributes of the prior search results.

To redistribute the ranked set of search results, the blender minimizes a gap determined from the difference between the ranked set of search results and the natural distribution. The resulting redistributed ranked set of search results more closely reflects the natural distribution. The redistributed ranked set of search results can then be provided to a computing device for display.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

As described, conventional search systems identify items in response to a search query. The identified items are ranked using a scoring system and provided back to a user as search results. These systems, however, have particular shortcomings that stem from the vast number of potential search results that can be identified for any given search query.

In one example, conventional search systems receive search queries and identify items across a network of computing systems, the Internet being one example. These search systems seek to identify any number of relevant items as search results, such as domain addresses for webpages, images, videos, news articles, online marketplace items, and so forth. The interconnected network of computing systems allows any connected device to store and provide items that could be identified as search results for a search query. Ultimately, this networked system creates particular challenges for search systems because it is an instantly changing and ever-expanding environment for identifying search results. Similarly, conventional search engines searching databases (even closed databases) having large numbers of items identifiable as search results have a similar problem.

The near-endless number of potential search results makes it difficult for search engines to provide the best search results in a way that they can be identified from among other, less relevant, search results. For instance, at the time of drafting this disclosure, a search query for "local cupcakes" was entered into a commonly used search engine. The search engine identified more than 222 million search results.

Due to the vast number of potential search results created by interconnected networks and large databases, it is essential for the operation of these networks and the use of such databases that the best search results are provided in a manner where they can be identified among other search results of a search query. This is because it is impossible to review every identified search result in an effort to determine which of the results are the most relevant. To put this in perspective, it would take roughly seven years to review 222 million search results, assuming each of the search results is reviewed for one second, nonstop.

To lessen this problem, search engines identify search results and then rank them. The search engine seeks to give the best search results the highest ranking because only a portion of the top-ranked search results can be reviewed. In this way, the best search results become identifiable, thus allowing the user to locate a particular search result.

Many times, however, conventional search engines fall short of this goal when ranking the search results. Consequently, this can lead to the inability to locate a particular search result among those that have been identified. Conventional search engines that score each identified search result are particularly susceptible to this problem. Because there are so many identified search results, the minutest difference in the score for the search result causes the search result to greatly increase or decrease in rank, sometimes in the degree of millions. This can ultimately result in the inability to locate particular search results.

Using another approach to solve these problems, some conventional search engines employ learning mechanisms to improve a ranking algorithm (a "ranker"). This approach modifies the ranking algorithm based on a user's interaction with search results. These conventional systems, however, can cause and be susceptible to presentation bias. The presentation bias occurs because only the highest ranked search results that are presented will receive interactions. The ranking algorithm is subsequently trained based on interactions with only the highest ranked results. Therefore, if the best search results are initially provided too low in the ranking to receive interactions, the trained ranking algorithm does not account for these results, thus perpetuating the bias. Over time, this presentation bias can cause the best results to maintain a low ranking, even when training the ranking algorithm on new data.

To lessen these problems, the technology described herein provides a blender that redistributes ranked search results based on a natural distribution. The redistribution provides a redistributed ranked set of search results that is more likely to include the best search results for the search query. The redistributed ranked set is then presented in response to the search query.

In this way, the search results that are provided to the user as the top results are more likely to include those items that the user intended when entering the search query. The redistributed ranked set is less susceptible to deficiencies stemming from scoring alone, and thus, it is more likely to present intended search results than conventional search engines. Further, by redistributing the ranked set using the natural distribution, the user is more likely to interact with different search results that would have initially been ranked too low. This reduces or eliminates the presentation bias of the conventional methods, resulting in a more accurate training set when training a machine learned search ranker.

One example method for achieving these advantages and improvements begins by receiving a search query at a search engine. The search engine identifies search results related to the search query and ranks the search results using a ranker to provide a ranked set of search results.

A proportional representation of attributes associated with the ranked set of search results is determined. The proportional representation of the attributes can be determined for a fixed number of top-ranked search results, such as the top 500 search results, as these top-ranked search results are more likely to be seen by a user.

The search engine applies a blender to the ranked set of search results to redistribute the search results into a redistributed ranked set of search results. This may be done for the entire ranked set of search results or a fixed number of highest ranked search results. The blender redistributes the ranked set of search results so that the redistributed ranked set of search results is closer to a natural distribution for the search query. That is, the blender redistributes the ranked set of search results proportionally to the natural distribution, such that the redistributed ranked set of search results includes a proportional representation of attributes that is close to a proportional representation of interactions with the attributes stored in a natural distribution index from which the natural distribution is determined.

To redistribute the ranked set of search results close to the natural distribution, the blender minimizes a gap between the ranked set of search results for the search query and the natural distribution for the search query. The gap is determined from the difference between the proportional representation of attributes within the search results and the proportional representation of interaction with the attributes. By minimizing the gap, the redistributed ranked set of search results more closely reflects the natural distribution.

Because the redistributed ranked set of search results more closely reflects the natural distribution, some search results identified for the search query are presented higher in the ranking, making it more likely that an intended search result is identified. The redistribution also serves to eliminate the presentation bias, as lower ranking, but proportionally relevant, search results are ranked higher, allowing for interaction with the proportionally relevant search results.

The method previously discussed is only one example that can be performed using the technology described herein. This and other examples will be realized using the technology provided by the drawings, which are referenced now to provide further detail.

Figure 1:
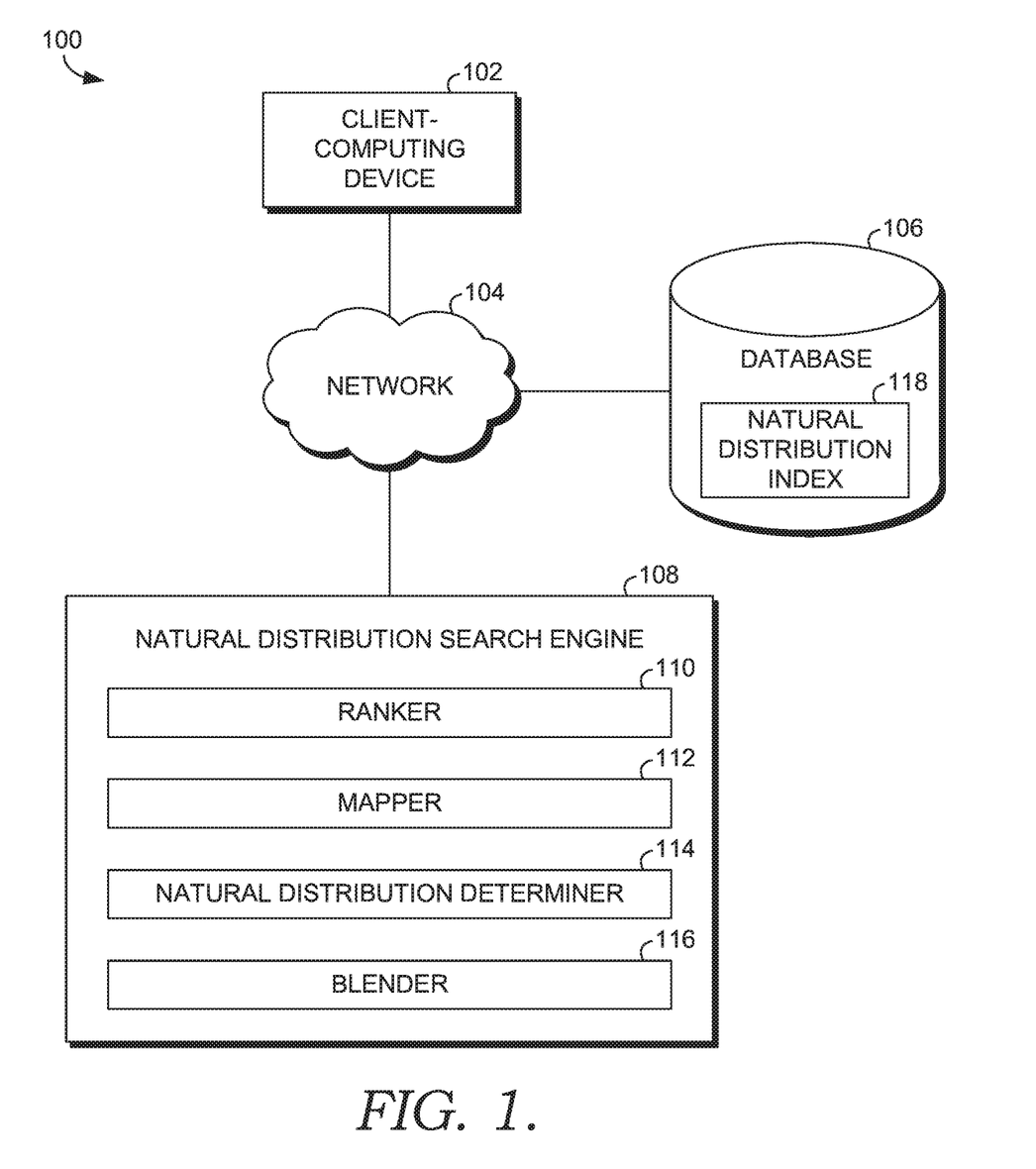
FIG. 1 is an example operating environment suitable for implementing a natural distribution search engine, in accordance with an aspect provided herein.

Turning now to FIG. 1, an example search system operating environment 100 is shown in which implementations of the present disclosure may be employed. In particular, FIG. 1 illustrates a high-level architecture of search system operating environment 100 having components in accordance with implementations of the present disclosure.

Among other components or engines not shown, search system operating environment 100 includes client-computing device 102. Client-computing device 102 is shown communicating using network 104 to database 106 and natural distribution search engine 108. Client-computing device 102 may be a client-computing device that corresponds to computing device 400 described with reference to FIG. 4.

Network 104 can include one or more networks (e.g., public network or virtual private network "VPN"). Network 104 may include, without limitation, one or more local area networks (LANs), wide area networks (WANs), or any other communication network or method.

Figure 4:
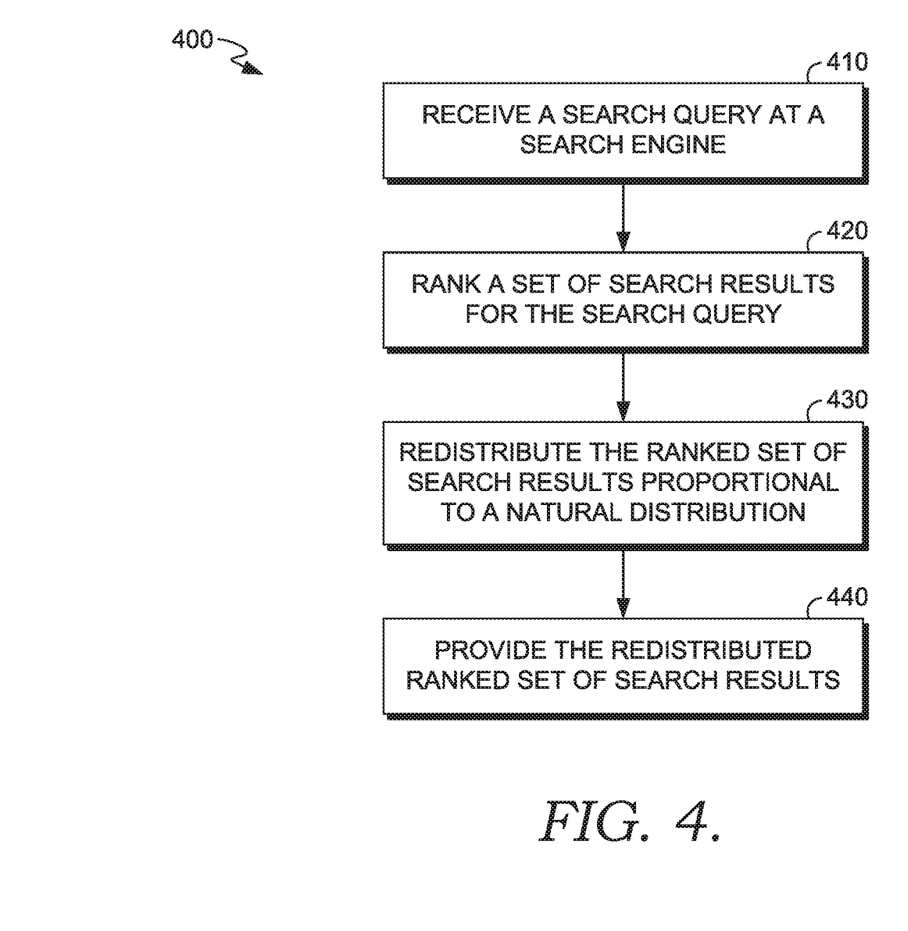
FIG. 4 is a flow diagram illustrating an example method for redistributing a ranked set of search results proportional to a natural distribution using the natural distribution search engine.

Database 106 generally stores information including data, computer instructions (e.g., software program instructions, routines, or services), or models used in embodiments of the described technology. Database 106 may store computer-readable instructions associated with functional components of natural distribution search engine 108. Although depicted as a single database component, database 106 may be embodied as one or more databases or may be in the cloud. Memory 412 of FIG. 4 is an example suitable for use as database 106.

The components of search system operating environment 100 can operate together to provide functionality for redistributing a ranked set of search results and presenting the redistributed ranked set, examples of which will be further described. Search system operating environment 100 supports processing search queries from client-computing device 102. In particular, client-computing device 102 can receive a search query and communicate the search query to natural distribution search engine 108. Client-computing device 102 can also operate with natural distribution search engine 108 to receive a redistributed ranked set of search results and display or cause the display of, all or a portion of, the redistributed ranked set.

Natural distribution search engine 108 interfaces with client-computing device 102 to receive a search query, to identify and rank search results, and to redistribute the ranked set of search results. Natural distribution search engine 108 provides the redistributed ranked set to client-computing device 102 based on receiving the search query.

In the example arrangement provided by FIG. 1, natural distribution search engine 108 and database 106 are illustrated as remote from client-computing device 102. However, as described, this is simply one example. Another specific arrangement not illustrated includes client-computing device 102 being integrated directly with database 106 storing one or more functions of natural distribution search engine 108, which can be executed by client-computing device 102. Thus, among other arrangements, components of natural distribution search engine 108 can reside wholly remote from client-computing device 102 on a back-end server, wholly on client-computing device 102, being stored and executed entirely on client-computing device 102, or partially on client-computing device 102 and the back-end server in any combination.

As illustrated in FIG. 1, components of natural distribution search engine 108 include ranker 110, mapper 112, natural distribution determiner 114, and blender 116.

Ranker 110 generally ranks search results that have been identified by natural distribution search engine 108 for a search query. Ranker 110 can include any algorithm or machine learned model that distinguishes aspects of search results and applies a weight to those aspects indicating a relevance to the search query. For instance, an algorithm may match terms of the search query to terms included in the search results. Those search results having more matching terms may be ranked higher than search results having less matching terms. The ranking algorithm or model may further use query expansion to identify relevant terminology and rank the search queries. One example machine learned ranker is determined using a neural network trained on a training set of search queries and search results that have been identified as relevant, for instance, through interaction with the results. Rankers suitable for use can be global rankers or individualized rankers. Global rankers are determined from a population of training data from various sources. Individual rankers can be determined for a single source, such as a person or entity, based on training data specific to that source.

Mapper 112 generally maps search queries to search results or search result attributes. Search results are identified by natural distribution search engine 108 in response to receiving a search query. Search result attributes generally include any feature or term that is related to a search result. This relationship mapping of search queries to search results or search result attributes can be stored on database 106 as part of natural distribution index 118.

To map search queries, mapper 112 can identify terms within the search query. This may be done using a series of n-grams. For instance, the search query "local cupcakes" includes two terms: "local" and "cupcakes." The n-gram representation would be "local cupcakes," "local," and "cupcakes." Each of these three terms may be identified for the search query.

Using the identified terms, mapper 112 can identify related terms. Related terms may be identified using query expansion methods. One example includes synonymic discovery by referencing an index of synonyms for any given term. Other more advanced methods include clustering analyses to identify related terms or vector space identification of related terminology. Another method of query expansion for identifying related terms includes referencing a database comprising historic query-result pairs determined when a user interacts with a search result of a search query. The terms included in the "query" are associated with the terms of the "result" for a given query-result pair. These associated terms can be used to identify the related terms for the search query. One example of identifying related terms for the search query "red shirt" includes terms such as "magenta," "rose," "pink," "top," "t-shirt," "outerwear," etc.

Mapper 112 can also identify features that are associated with the search query terms or the related terms. A feature includes any identifiable element of a search result. In some cases, features further define a search result by identifying the search result as including a particular element of a category. Turning back to the iPhone example, iPhones can generally be further defined based on their model, color, condition, price, etc. These categories can be subdivided into individual elements. For instance, iPhone colors include silver, black, and white. In this example, the color "silver" is a feature that can be associated with the search query or a related term that includes "iPhone." To identify these features, mapper 112 may utilize a web crawler to find iPhone features and identify new iPhone features when published on the Internet. Another example method can include natural language processing of item descriptions of products published on an online marketplace. These are just some examples among many that can be used to identify features for a search query term or related term.

Having identified search result attributes that include features or terms, mapper 112 may map search queries to related search results or search result attributes. The term "relationship mapping" is used herein to describe mapping a search query to its search result attributes. One method of relationship mapping includes identifying search results for prior search queries. Mapper 112 identifies the search result attributes of the search results and associates the search result attributes with the prior search query. This association can be indexed and stored, for example, as part of natural distribution index 118.

Figure 2:
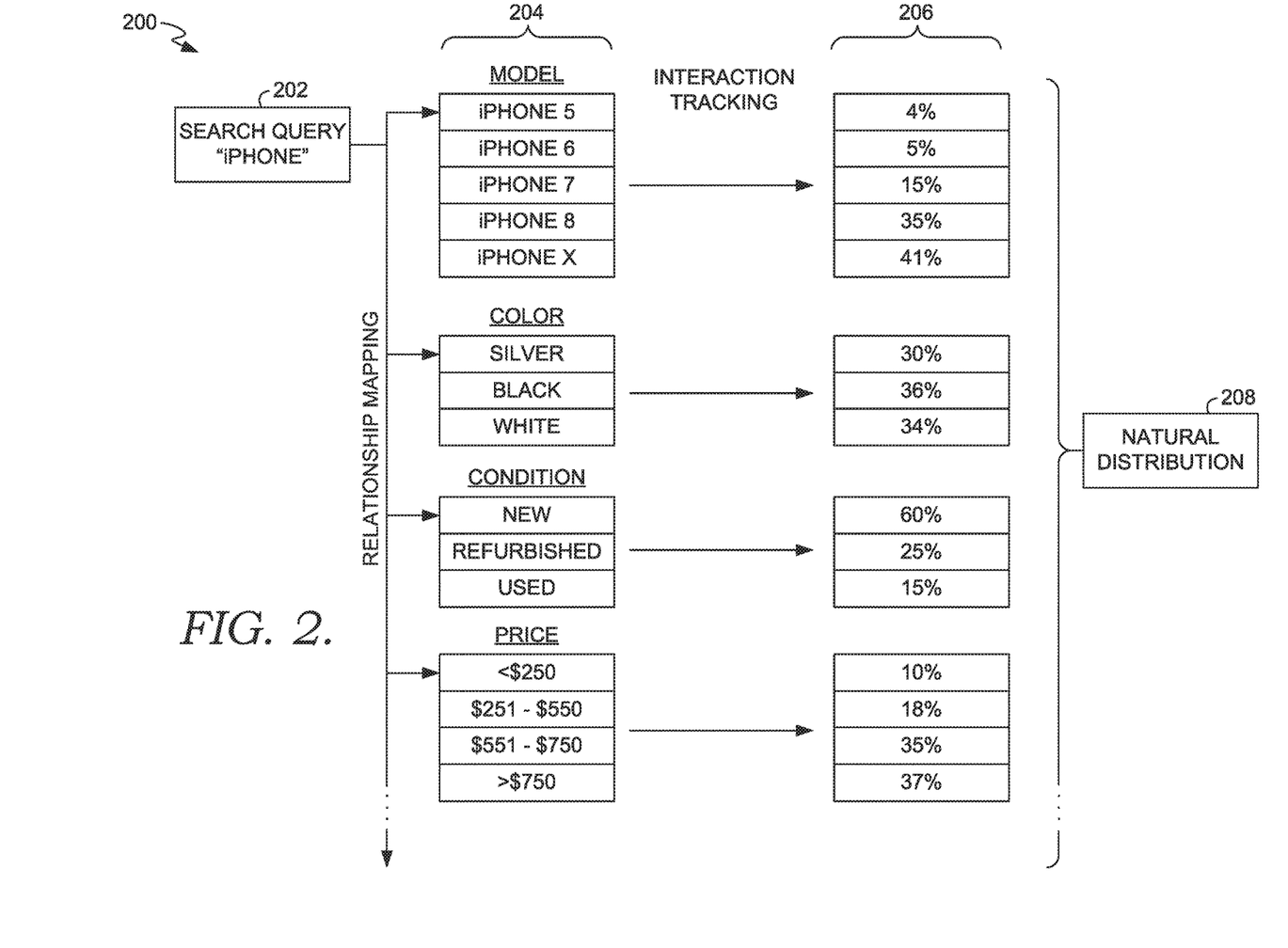
FIG. 2 is an example natural distribution index suitable for use by the natural distribution search engine, in accordance with an aspect provided herein.

Turning briefly to FIG. 2, example natural distribution index 200 is provided. Natural distribution index 200 provides an example of mapping search query 202 to search result attributes 204. As illustrated in this example, search query 202 for "iPhone" is mapped to search result attributes 204 that include attributes for iPhone models (iPhone 5, iPhone 6, etc.), for colors (silver, black, and white), condition (new, refurbished, and used), price (less than $250, from $251 to $550, from $551 to $750, and greater than $750), and so forth. Search result attributes 204 are provided as examples, and it will be appreciated that mapper 112 of FIG. 1 may identify many more attributes for search query 202. Another type of search result attribute 204 that can be mapped with search query 202, but is not illustrated, is transaction type, such as a fixed price transaction or an auction, where the identified search results are items stored on a database and offered for sale at an online marketplace.

With reference again to FIG. 1, natural distribution determiner 114 generally determines a natural distribution for a search query. Natural distribution determiner 114 can use interaction tracking to determine the natural distribution.

Interaction tracking generally tracks interactions occurring after a search query and associates the interactions with the search query. Interactions can be any action performed at or using a computing device, such as client-computing device 102. Examples include a mouse click, verbal command, hover action, keystroke, and the like. Another specific example of an action is entry of a second search query that further defines a first search query (e.g., a first search query being "iPhone" and a second search query being "silver iPhone 8"). Other actions will be recognized by those of ordinary skill in the art.

These interactions can be associated with search query attributes. Where a search query receives an interaction, the search query attributes of that search query are identified as receiving an interaction. Additionally, where a second search query further defines the first, the attributes of the second search query may also be identified as receiving an interaction (e.g., "silver" and "8" being identified attributes in the immediately preceding example). Natural distribution determiner 114 tracks the interactions by identifying those search query attributes receiving interactions and storing the tracking information in datastore 106.

From the tracking information generated through interaction tracking, natural distribution determiner 114 determines proportional representations of interactions with search result attributes. A proportional representation of interactions with search result attributes may include the proportional amount of interactions received by an element relative to other elements of a category. Natural distribution determiner 114 can index the proportional representation of interactions with the respective search result attributes in natural distribution index 118 stored on datastore 106.

Natural distribution index 118 can be a global index that includes tracking information from a population of users. In other cases, natural distribution index 118 may be a specific index, generated from tracking information for a single source, e.g., a single person or entity.

With continued reference to FIG. 1, and also to natural distribution index 200 of FIG. 2, interaction tracking by natural distribution determiner 114 for search result attributes 204 is represented by horizontal arrows extending to respective proportional representations of interactions 206. In the illustrated example, for search query 202 "iPhone," identified search results included search result attributes of "iPhone 5," "iPhone 6," "iPhone 7," "iPhone 8," and "iPhone X." According to the interaction tracking of natural distribution determiner 114, when search results were provided for search query 202 "iPhone," 4% of the time search results having the search result attribute "iPhone 5" received an interaction, while search results having the search result attribute "iPhone 6" received an interaction 5% of the time. Likewise, those search results associated with the search result attribute "iPhone 7" received 15% of the interactions, those associated with "iPhone 8" received 35% of the interactions, and those associated with "iPhone X" received 41% of the interactions. Natural distribution index 200 additionally illustrates the results of interaction tracking for search result attributes within the categories of color, condition, and price.

Natural distribution determiner 114 can determine the natural distribution using natural distribution index 200. Natural distribution 208 for search query 202 is illustrated as including each of the proportional representations of interactions 206 for all search result attributes 204 across all categories. However, it will be understood that natural distribution 208 may include one or more of search result attributes 204, which may be in any combination. In the example illustrated, natural distribution 208 for search query 202 "iPhone" dictates that 35% of search results should include iPhone 8s, while 41% should include iPhone Xs. Using another illustration, natural distribution 208 for search query 202 "iPhone" dictates that 60% of search results should include new iPhones, while 25% should include refurbished iPhones.

Continuing with FIG. 1, blender 116 generally redistributes a set of ranked search results determined using ranker 110 to generate a redistributed ranked set of search results. Blender 116 may redistribute at least a portion of the ranked set of search results. In some cases, the portion redistributed by blender 116 is called the "impression distribution," which is a fixed number of top-ranked search results. In an example, the impression distribution can be a fixed number divisible by a number of search results displayed on a webpage. The number of search results displayed on the webpage can be any number, and as will be appreciated, can be different for different webpages. For instance, one search engine may return 25 search results per webpage, while another may return 50. The impression distribution can be configured to the number of search results displayed on any webpage. Other examples of the impression distribution, i.e., the fixed number, may be 25 search results. In further examples, the impression distribution is 50, 75, 100, 200, 300, 400, or 500. It will be understood that the impression distribution can be predetermined to be any fixed number, and these are simply examples.

Blender 116 can be configured to redistribute the ranked set of search results proportional to a natural distribution determined by natural distribution determiner 114. Said differently, blender 116 redistributes all of the ranked set of search results or an impression distribution set of the ranked set of search results so that the redistributed ranked set of search results includes search results having search result attributes proportional to the natural distribution for the search query.

Blender 116 redistributes the ranked set of search results by identifying and minimizing a gap. The gap can be measured between the ranked set of search results (e.g., the impression distribution) for the search query and the natural distribution determined for the search query. In this example, the gap comprises a difference between a proportional representation of search result attributes within the ranked set of search results and the one or more of the proportional representation of interactions of the natural distribution. It will be appreciated that this is one method of calculating the gap and that other methods may be utilized by one of ordinary skill. Such methods are intended to be within the scope of this disclosure. The gap can be determined for a single search result attribute, a category of search result attributes, the selected one or more search query attributes, or all of the search query attributes for a search query.

By way of continued example, and with reference back to FIG. 2, a natural distribution selected from color and condition, includes 0.30 silver, 0.36 black, 0.34 white, 0.60 new, 0.25 refurbished, and 0.15 used. A hypothetical impression distribution of a ranked set of search results includes 50% (0.50) black and 50% (0.50) white, and includes 40% (0.40) new, 45% (0.45) refurbished, and 15% (0.15) used. The gap can be calculated for each of the categories using the proportional representation of interactions for each search result attribute of the category. In this example, the gap for color is 0.60, as determined by |0.30−0.0|+|0.36−0.50|+|0.34−0.50|, while the gap for condition is 0.40, as determined by |0.60−0.40|+|0.25−0.45|+|0.15−0.15|. The total gap in this example is 1.0.

To generate a redistributed ranked set of search results that is proportional to the natural distribution of a search query, blender 116 can redistribute the ranked set of search results to minimize the gap. The redistribution may be done for the search results of the impression distribution. Blender 116 can use any dimension reduction method known in the art. One example method suitable for use is an auto-encoder neural network. Among others, suitable methods include linear dimensionality reduction methods (e.g., principal component analysis, factor analysis, linear discriminant analysis) and non-linear dimensionality reduction methods (e.g., multi-dimensional scaling, isometric feature mapping, locally linear embedding, t-distributed stochastic neighbor embedding).

Blender 116 modifies the gap by adding or removing search results from the ranked set of search results. In a particular example, search results are added and removed from the impression distribution. Search results of the ranked set of search results that are outside of the impression distribution can be moved into the impression distribution to modify the gap. For instance, if the impression distribution is a fixed number of 500 search results, those search results ranked greater than the impression distribution (greater than 500 in this case) can be added to the impression distribution, while a same number of search results in the impression distribution can be removed, thereby maintaining the fixed number. This modifies the gap of the impression distribution. Blender 116 can minimize the gap of the impression distribution by modifying the impression distribution in this manner utilizing any of the dimension reduction methods.

Figure 3:
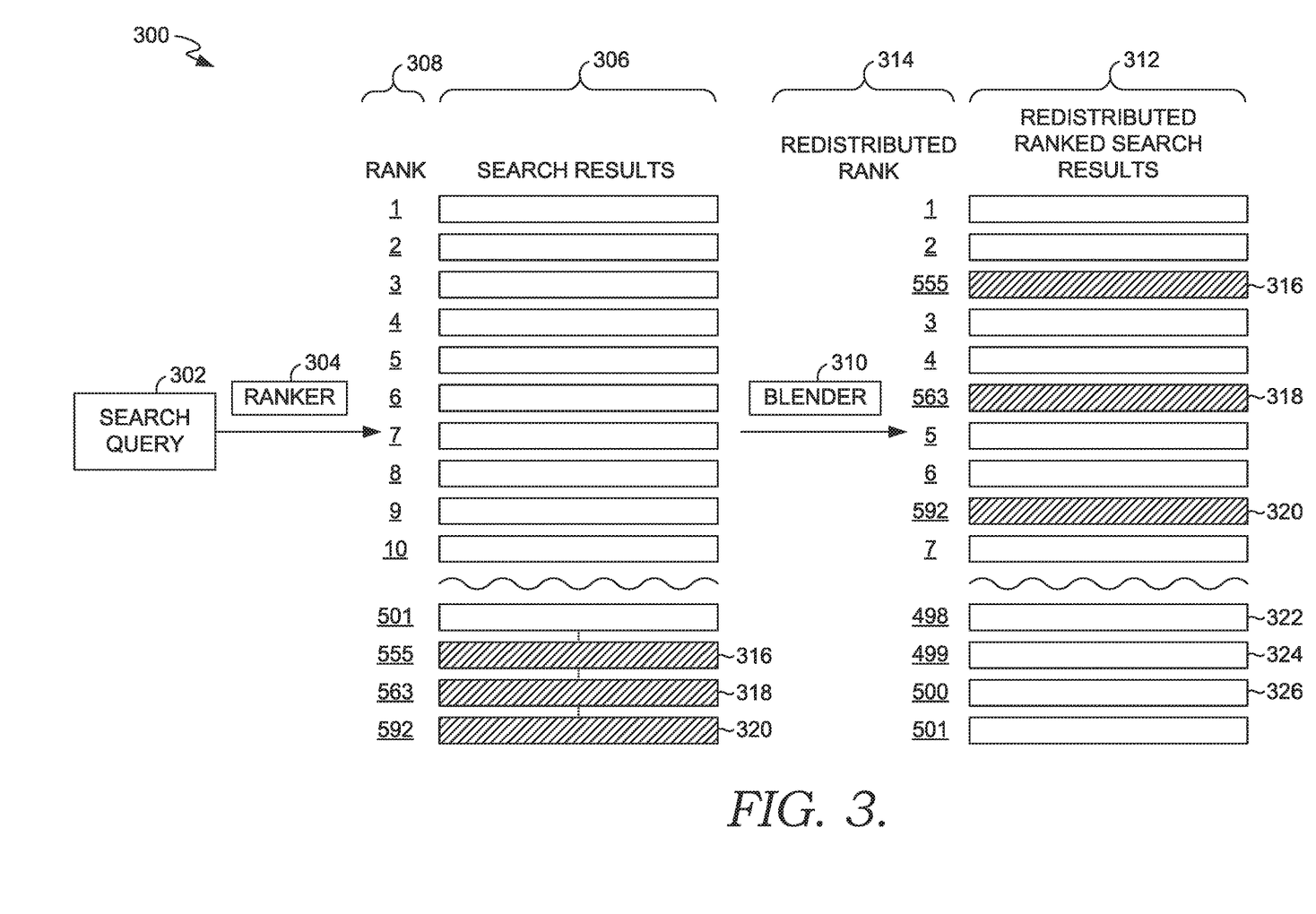
FIG. 3 is a block diagram illustrating an example redistribution of search results by the natural distribution search engine, in accordance with an aspect provided herein.

To illustrate this, FIG. 3 is provided as an example redistribution of search results using natural distribution search engine 108 of FIG. 1. With reference now to FIG. 3, search query 302 is provided. Search results are identified for search query 302 and are ranked using ranker 304. Ranker 304 generates ranked set of search results 306. In this particular example, it is intended that the impression distribution is 500 search results. Rank 308 illustrates a ranking for each search result of ranked set of search results 306. Some search results of ranked set of search results 306 are omitted for clarity, as illustrated by a wavy line between search results.

Still with reference to FIG. 3, blender 310 is applied to ranked set of search results 306 to redistribute the search results proportional to a natural distribution. In this example, the natural distribution includes a greater proportion of search result attributes that are associated with first search result 316, second search result 318, and third search result 320 (illustrated using slashed lines) than are included in the impression distribution of ranked set of search results 306. As such, to minimize the gap, blender 310 redistributes search results to increase the proportion of these search result attributes within the impression distribution. In doing so, first search result 316, second search result 318, and third search result 320 are redistributed by blender 310 from outside of the impression distribution to within the impression distribution of redistributed ranked set of search results 312, as illustrated by redistributed rank 314. In this example, fourth search result 322, fifth search result 324, and sixth search result 326 are removed from the impression distribution to maintain the fixed number of 500 search results.

Turning back to FIG. 1, by minimizing the gap, the ranked set of search results or the impression distribution set of search results becomes proportional to the natural distribution of the search query. Put another way, as the gap is minimized, the impression distribution generated by ranker 110 is redistributed by blender 116 to more closely align with the natural distribution. As will be understood by one of ordinary skill in the art, there will be scenarios where the gap cannot be minimized entirely to zero. Such is the nature of dimensional analysis. Therefore, "proportional to a natural distribution" is not intended to mean that the ranked set of search results is precisely the same proportion as the natural distribution. Instead, "proportional to a natural distribution" is also meant to include a redistributed ranked set of search results that is close to or near the natural distribution, where close to or near includes a redistributed ranked set of search results having a gap above zero, as minimized by any of the dimensional analysis methods.

It will be understood that blender 116 and ranker 110 may be discrete algorithms or models. However, as noted, components of natural distribution search engine 108 are described as discrete components to aide in describing the technology. Although in other embodiments intended by this disclosure, the functions of these components may overlap or be further divided. Thus, it will also be understood that other embodiments of the technology include a combined ranker and blender. That is, the blender may be a modification to the ranker (a modified ranker) that accounts for the natural distribution when ranking search results for a search query. In such cases, the modified ranker can output a redistributed ranked set of search results. While the disclosure describes the blender and the ranker separately, it is intended that this also include a modified ranker. That is, where functions are separately described as "ranking a set of search results" and "redistributing the ranked set of search results," it is intended that these separately disclosed steps also include a single action of ranking and redistributing a set of search results by a modified ranker to generate the redistributed ranked set of search results.

Methods may be performed using the natural distribution search system described herein. In embodiments, one or more computer storage media having computer-executable instructions embodied thereon that, when executed, by one or more processors, cause the one or more processors to perform the methods in the search system.

One example for redistributing search results proportional to a natural distribution is illustrated by method 400 of FIG. 4. At block 410, a search query is received at a search engine. The search query is received from a client-computing device. The client-computing device may be remote from the search engine, or may host all of or a portion of the search engine. In either aspect, the search engine receives the search query from the client-computing device. At block 420, a set of search results for the search query is ranked. The search engine can rank identified search results using a ranker. Ranker 110 of FIG. 1 is an example ranker that can be used by the method. By ranking an identified set of search results, the search engine provides a ranked set of search results for the search query.

At block 430, the ranked set of search results is redistributed. Blender 116 of FIG. 1 is an example blender suitable for use by the method. The blender redistributes the ranked set of search results so that the ranked set is proportional to a natural distribution for the search query. In some cases, the blender redistributes a portion of the ranked set of search results, which can include a fixed number of top-ranked search results. The natural distribution for the search query is determined from interaction tracking of prior search queries. The interaction tracking includes tracking a user's interaction subsequent to entering a search query. From this, a natural distribution index is generated to determine the natural distribution for the search query. An example natural distribution index comprises a relationship mapping of search query terms mapped to search result attributes and a proportional representation of interaction with the search result attributes determined through the interaction tracking. By applying the blender, the search engine generates a redistributed ranked set of search results from the ranked set of search results. At block 440, the redistributed ranked set of search results is provided to the client-computing device for display.

With reference back to FIG. 1, and the natural distribution search system operating environment 100, embodiments described herein support redistributing and providing search results that are proportional to a natural distribution. In general, the search engine components refer to integrated components that implement the natural distribution search engine 108. The integrated components refer to the hardware architecture and software framework that support functionality using the search system components. The hardware architecture refers to physical components and interrelationships thereof and the software framework refers to software providing functionality that can be implemented with hardware operated on a device. The end-to-end software-based search system can operate within the other components to operate computer hardware to provide search system functionality. As such, the search system components can manage resources and provide services for the search system functionality. Any other variations and combinations thereof are contemplated with embodiments of the present disclosure.

By way of example, natural distribution search engine 108 can include an API library that includes specifications for routines, data structures, object classes, and variables may support the interaction the hardware architecture of the device and the software framework. These APIs include configuration specifications such that the components therein can communicate with each other for form generation, as described herein.

With continued reference to FIG. 1, FIG. 1 illustrates an exemplary search system 100 in which implementations of the present disclosure may be employed. In particular, FIG. 1 shows a high-level architecture of search system operating environment 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed can be performed in a distributed manner. The system may be formed from other systems and components thereof. It should be understood that this and other arrangements described herein are set forth only as examples.

Having identified various components of search system operating 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. The functionality natural distribution search engine 108 can be further described based on the functionality and features of the previously-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Figure 5:
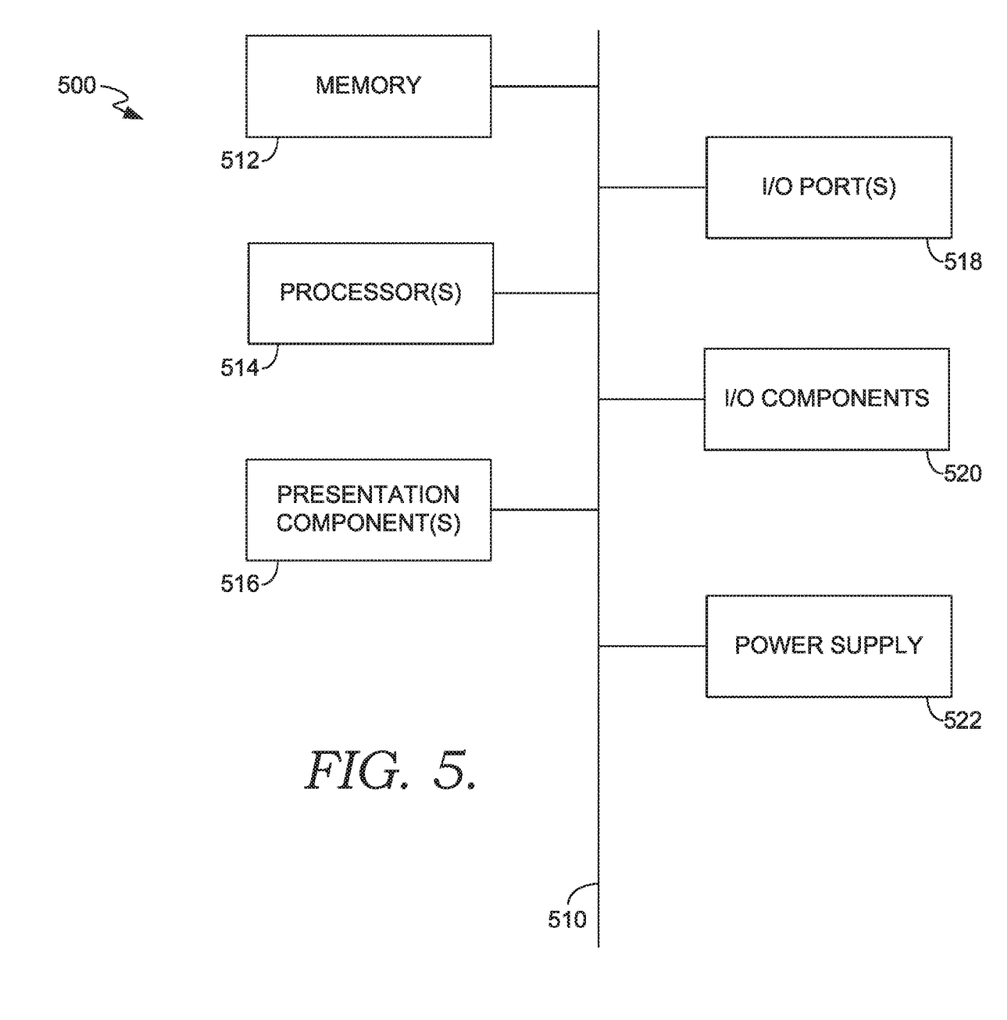
FIG. 5 is a block diagram of an example operating environment in which embodiments of the present technology may be employed.

Having described an overview of embodiments of the present technology, an example operating environment in which embodiments of the present technology may be implemented is described below in order to provide a general context for various aspects. Referring initially to FIG. 5, in particular, an example operating environment for implementing embodiments of the present technology is shown and designated generally as computing device 500. Computing device 500 is but one example of a suitable computing environment and is not intended to suggest any limitation as to the scope of use or functionality of the technology. Neither should computing device 500 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrates an example computing device that can be used in connection with one or more embodiments of the present technology. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile or nonvolatile memory. The memory may be removable, non-removable, or a combination thereof. Example hardware devices include solid-state memory, hard drives, optical-disc drives, etc. Computing device 500 includes one or more processors that read data from various entities such as memory 512 or I/O components 520. Presentation component(s) 516 present data indications to a user or other device. Examples of presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

The distributed computing environment depicted herein is merely an example. Components can be configured for performing novel aspects of the technology, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A computer-implemented method, the method comprising:
receiving a search query at a search engine, the search query received from a client-computing device;
ranking a set of search results for the search query based on a ranker associated with the search engine;
redistributing at least a portion of the ranked set of search results proportional to a natural distribution of search result attributes for a category of search result attributes, the natural distribution determined from interaction tracking of search result attributes of prior search results and comprising a relative proportion of interactions received by the search result attributes within the category of search result attributes; and
providing the redistributed ranked set of search results to the client-computing device.

2. The method of claim 1, wherein at least the portion of the ranked set of search results that is redistributed comprises a fixed number of highest ranked search results.

3. The method of claim 2, wherein the redistributed ranked set of search results is provided to the client-computing device by a webpage of the search engine, the webpage configured to return a particular number of search results, wherein the fixed number of highest ranked search results is divisible by the particular number of search results configured for the webpage.

4. The method of claim 2, wherein the fixed number of highest ranked search results comprises a first search result, and wherein the first search result is removed from the fixed number by the redistributing to obtain the natural distribution for the portion of the redistributed ranked set of search results.

5. The method of claim 1, further comprising determining the natural distribution from a natural distribution index, the natural distribution index comprising a relationship mapping of search query terms to search result attributes and a proportional representation of interactions with the search result attributes.

6. The method of claim 1, wherein the redistributing is performed by minimizing a gap between the ranked set of search results for the search query and the natural distribution determined for the search query, wherein the gap comprises a difference between a proportional representation of search result attributes within the ranked set of search results and the natural distribution.

7. The method of claim 1, wherein the natural distribution is specific to a user and is determined from the interaction tracking of the prior search results that are associated with the user.

8. The method of claim 1, wherein the redistributing is performed by a blender, and wherein the blender is a modification of the ranker.

9. One or more computer storage media storing computer-readable instructions that, when executed by a processor, cause the processor to implement a method comprising:
tracking interactions of search result attributes associated with search results provided by a search engine at a client-computing device;
determining a natural distribution for a category of search result attributes, the natural distribution determined from the interaction tracking by identifying a relative proportion of interactions received by the search result attributes within the category of the search result attributes; and
providing a set of search results in an order determined by the natural distribution in response to receiving a search query from the client-computing device.

10. The computer storage media of claim 9, further comprising:
ranking the set of search results for the search query based on a ranker associated with the search engine to provide a ranked set of search results; and
redistributing at least a portion of the ranked set of search results proportional to the natural distribution, wherein the order is based on the redistributed ranked set of search results.

11. The computer storage media of claim 10, wherein at least the portion of the ranked set of search results that is redistributed comprises a fixed number of highest ranked search results.

12. The computer storage media of claim 10, wherein the redistributing further comprises minimizing a gap between the ranked set of search results for the search query and the natural distribution, the gap comprising a difference between a proportional representation of search result attributes within the ranked set of search results and the natural distribution.

13. The computer storage media of claim 10, wherein the redistributing is performed by a blender, and wherein the blender is a modification of the ranker.

14. The computer storage media of claim 9, further comprising determining the natural distribution from a natural distribution index, the natural distribution index comprising a relationship mapping of search query terms of search queries associated with the search results to search result attributes and a proportional representation of interactions with the search result attributes.

15. The computer storage media of claim 9, wherein the natural distribution is specific to a user based on the interaction tracking of the search results associated with the user.

16. A system comprising:
at least one processor;
computer storage media storing computer-readable instructions that, when executed by the at least one processor, cause the at least one processor to implement a method comprising:
receiving a search query at a search engine;
ranking at least a portion of a set of search results for the search query proportional to a natural distribution of search result attributes for a category of search result attributes, the natural distribution determined from interaction tracking of search result attributes associated with prior search results and comprising a relative proportion of interactions received by the search result attributes within the category of search result attributes, and wherein a proportional representation of interactions with search result attributes of the prior search results identified from the interaction tracking determines the natural distribution of search result attributes for the category; and
providing the ranked set of search results at the search engine in response to the search query.

17. The system of claim 16, wherein ranking at least the portion of the set of search results further comprises:
ranking the set of search results for the search query using a ranker associated with the search engine; and
redistributing at least the portion of the ranked set of search results proportional to the natural distribution.

18. The system of claim 17, wherein the portion of the ranked set of search results that is redistributed is a fixed number of highest ranked search results.

19. The system of claim 18, wherein the fixed number of highest ranked search results is divisible by a particular number of search results configured to be displayed by a webpage of the search engine providing the ranked set of search results.

20. The system of claim 18, wherein the fixed number of highest ranked search results comprises a first search result, and wherein the first search result is removed from the fixed number by the redistributing to obtain the natural distribution for the portion of the ranked set of search results.

* * * * *